(12) United States Patent
Fish

(10) Patent No.: US 7,966,218 B1
(45) Date of Patent: Jun. 21, 2011

(54) APPARATUS, METHOD AND SYSTEM FOR BROADCAST CONTENT EXPIRATION AFTER RECORDED BY A USER

(75) Inventor: Charles M. Fish, New Hope, PA (US)

(73) Assignee: Time Warner, Inc, New York, NY (US)

( * ) Notice: Subject to any disclaimer, the term of this patent is extended or adjusted under 35 U.S.C. 154(b) by 1141 days.

(21) Appl. No.: 10/864,823

(22) Filed: Jun. 8, 2004

(51) Int. Cl.
  G06Q 30/00 (2006.01)
  H04N 7/16 (2011.01)
  H04N 9/80 (2006.01)

(52) U.S. Cl. .................. 705/14.68; 705/14.69; 725/22; 386/249

(58) Field of Classification Search .............. 725/22, 725/32, 36, 58; 705/14.4, 14.43, 14.55, 14.61, 705/14.68, 14.69; 386/249, 250, 251
See application file for complete search history.

(56) References Cited

U.S. PATENT DOCUMENTS

| | | | | |
|---|---|---|---|---|
| 5,675,607 A | * | 10/1997 | Alesio et al. ............. | 379/114.02 |
| 7,328,448 B2 | * | 2/2008 | Eldering et al. ................ | 725/32 |
| 2002/0083443 A1 | * | 6/2002 | Eldering et al. ................ | 725/34 |
| 2002/0100041 A1 | * | 7/2002 | Rosenberg et al. ............ | 725/32 |
| 2002/0138831 A1 | * | 9/2002 | Wachtfogel et al. ........... | 725/32 |
| 2002/0170053 A1 | * | 11/2002 | Peterka et al. .................. | 725/31 |
| 2003/0033601 A1 | * | 2/2003 | Sakata et al. .................... | 725/29 |
| 2003/0154475 A1 | * | 8/2003 | Rodriguez et al. ............. | 725/32 |
| 2003/0182567 A1 | | 9/2003 | Barton et al. | |
| 2004/0025174 A1 | * | 2/2004 | Cerrato ............................ | 725/9 |
| 2004/0059790 A1 | | 3/2004 | Austin-Lane et al. | |
| 2005/0060745 A1 | * | 3/2005 | Riedl et al. ...................... | 725/42 |
| 2005/0215238 A1 | * | 9/2005 | Macaluso ................. | 455/414.1 |
| 2005/0216932 A1 | * | 9/2005 | Danker ........................... | 725/32 |

FOREIGN PATENT DOCUMENTS

| | | | |
|---|---|---|---|
| WO | WO 01/77954 | * | 10/2001 |
| WO | WO 0177954 A2 | | 10/2001 |
| WO | WO2004/021205 | * | 3/2004 |

\* cited by examiner

*Primary Examiner* — Hoang-Vu A Nguyen-Ba
(74) *Attorney, Agent, or Firm* — Gottlieb, Rackman & Reisman, P.C.

(57) ABSTRACT

An apparatus, method, and system for a Media Expiration System (MES) that improves upon current content control systems by better managing media recordings. The MES enables media owners to disable recordings of their broadcast content and/or advertising, locally, after the content has been recorded by a consumer. In one embodiment, the MES places expiration stamps into broadcast media as it is recorded by a consumer electronics device. The MES tracks viewing habits, enables the purchasing of extended views of programs, and removes expired media programming content. The manner and way in which this is achieved results in the expiration of stale media content.

28 Claims, 4 Drawing Sheets

APPARATUS, METHOD AND SYSTEM FOR BROADCAST CONTENT EXPIRATION AFTER RECORDED BY A USER

RELATED APPLICATIONS

This application hereby incorporates by reference the application for letters patent, Ser. No. 10/835,834, titled "Apparatus, Method And System For Intelligent Advertisements," and filed in the United States Patent and Trademark Office on Apr. 30, 2004 in the name of David Alan Bryan.

This application also hereby incorporates by reference the application for letters patent, Ser. No. 10/737,870, titled "Apparatus, Method And System To Implement An Integrated Data Security Layer," and filed in the United States Patent and Trademark Office Dec. 16, 2003 in the name of Michael Wise, et al.

FIELD

The present invention is directed generally to an apparatus, method, and system of content management, and more specifically to an apparatus, method and system for the expiration of recordings of media content.

BACKGROUND

Media Content Recordings

Typically, media content is disseminated through broadcasts such as radio and television. Broadcast media, including television and radio, provide the bulk of today's news, weather, sports, and entertainment programming. The term "broadcast" refers to a distribution method whereby the programming is transmitted from a single central location to large number of recipients over a common medium. Examples include traditional "over-the-air" commercial radio and television broadcasts, satellite television and radio systems (e.g., DIRECT TV® company's system, ECHOSTAR® company's system, XM® company's system, etc.), and cable television systems. Broadcast programs may include movies, music, series, news and weather reports, commercial messages, and other items of interest. Broadcast systems have typically lacked a means for communicating information from the recipient to the broadcaster (a so-called "back-channel").

Generally, the public views media content as it is being broadcast. However, increasingly, many users are time-shifting and recording media content on a multitude of recording devices such as (Digital) Video Cassette Recorders (VCRs), Digital Video Recorders, Recordable DVDs, personal computers, and/or the like. Also, users are archiving and storing content digitally. For example, users are encoding their CD collections into digital file formats such as MP3 onto their computers and portable audio devices.

Traditional broadcast programming generally contains no provision for limiting the playback or copying of recorded material. One exception is the Macrovision® company's copy-protection system. The Macrovision® company's system prevents copying to traditional VCRs. This is accomplished by modifying the analog video signal in such a way that most VCRs cannot make a usable copy while most television receivers are able to present the video program with minimal distortion.

SUMMARY

No effective and widely deployed solution exists to disable and/or destroy recordings of media content so as to contain and/or stem the spread of unauthorized digital reproduction of the recordings. Currently, recordings of broadcast recordings made for the purposes of time shifting and/or otherwise may linger on user devices indefinitely, far beyond any fair use allotment for time shifting, which effectively allows viewers to transform a time shifted broadcast into a permanent and unauthorized copy of the broadcast media content. Furthermore, commercial advertisements in the broadcast recording can become stale and outdated, reducing the value of such advertisements. The present invention overcomes these problems by introducing a Media Expiration System (MES) that allows the content owner to still allow viewers to time shift broadcasts, but allows the content owner to force the expiration of such recorded media content after a specified amount of time. The MES enables media owners to disable recordings of their broadcast content after the content has been recorded by a consumer. In one embodiment, the MES places expiration stamps into broadcast media as it is recorded by a consumer electronics device. In another embodiment, the MES places expiration stamps into advertisements incorporated into broadcast recordings and replaces them as they become stale. The MES tracks viewing habits, enables the purchasing of extended views of programs, removes expired media programming content, and more. The manner and way in which this is achieved, results in an apparatus, system, and method that was heretofore unavailable.

In accordance with certain aspects of the present invention, the above-identified problems are overcome and a technical advance is achieved in the art of media content management. An exemplary apparatus to terminate media content recordings on a computer follows. The apparatus has a memory for storing instructions and a processor that can issue the instructions stored in memory. The stored instructions issue signals to: identify a media content recording and determine a termination time for the media content recording. The apparatus can establish a termination time for the media content recording, if no termination time exists for the media content recording. The apparatus may terminate the media content recording, if a current time has reached the media content recording's termination time or if a number of impressions that may be experienced by a user has been exceeded.

BRIEF DESCRIPTION OF THE DRAWINGS

The accompanying drawings illustrate various non-limiting, example, inventive aspects in accordance with the present disclosure.

The leading number of each reference number within the drawings indicates the first figure in which that reference number is introduced. As such, reference number 101 is first introduced in FIG. 1. Reference number 201 is first introduced in FIG. 2, etc.

DETAILED DESCRIPTION

The disclosed Media Expiration System (MES) improves upon current content control systems by better managing media recordings. The MES enables media owners to disable recordings of their program content after the content has been recorded by a consumer. In one embodiment, the MES places expiration stamps into broadcast media as it is recorded by a consumer electronics device. The MES tracks viewing habits, enables the purchasing of extended views of programs, removes expired media programming content, and more.

Traditional broadcast programs comprise two groups of elements: the first group is the media content itself (including one or more of audio, video, closed captions, commercial messages or advertisements, etc.), and the second group is the metadata. The media content is what the user watches and/or listens to. The metadata includes information associated with or about the media content (program title, description, content ratings and warning labels, etc.). The user does not typically experience the metadata directly (although some of the metadata may be presented, for example, as part of a program guide). There are a number of ways that metadata may be used to protect the program from unauthorized copying or playback, which are described in greater detail throughout this disclosure.

In one embodiment, metadata is attached to a broadcast program to indicate an expiration date and time, i.e., an expiration stamp. The playback equipment for the broadcast programming includes a clock/calendar as well as a function to read the expiration date and time on broadcast programs. The playback equipment would allow playback only if the current date/time is before the expiration date/time.

In one embodiment, the expiration date/time metadata is attached to the broadcast program in such a way that it cannot be easily removed, modified, or replaced. One method for attaching date/time metadata is to use a digital watermark. Digital watermarking technologies allow providers to embed within the media content (audio, video, etc.) a digital code that is imperceptible during normal presentation but readable by the playback equipment. This is done by making subtle changes to samples of the original digital content.

In another embodiment, the playback equipment includes a Personal Video Recorder. In this embodiment, broadcast programs are recorded, in digital form, on a hard disk drive, optical drive, or other digital storage medium. The digital media is scanned periodically and programs are purged as the expiration date/time is passed so that these programs would not be viewable after their expiration.

Check Recordings

Figure 1:
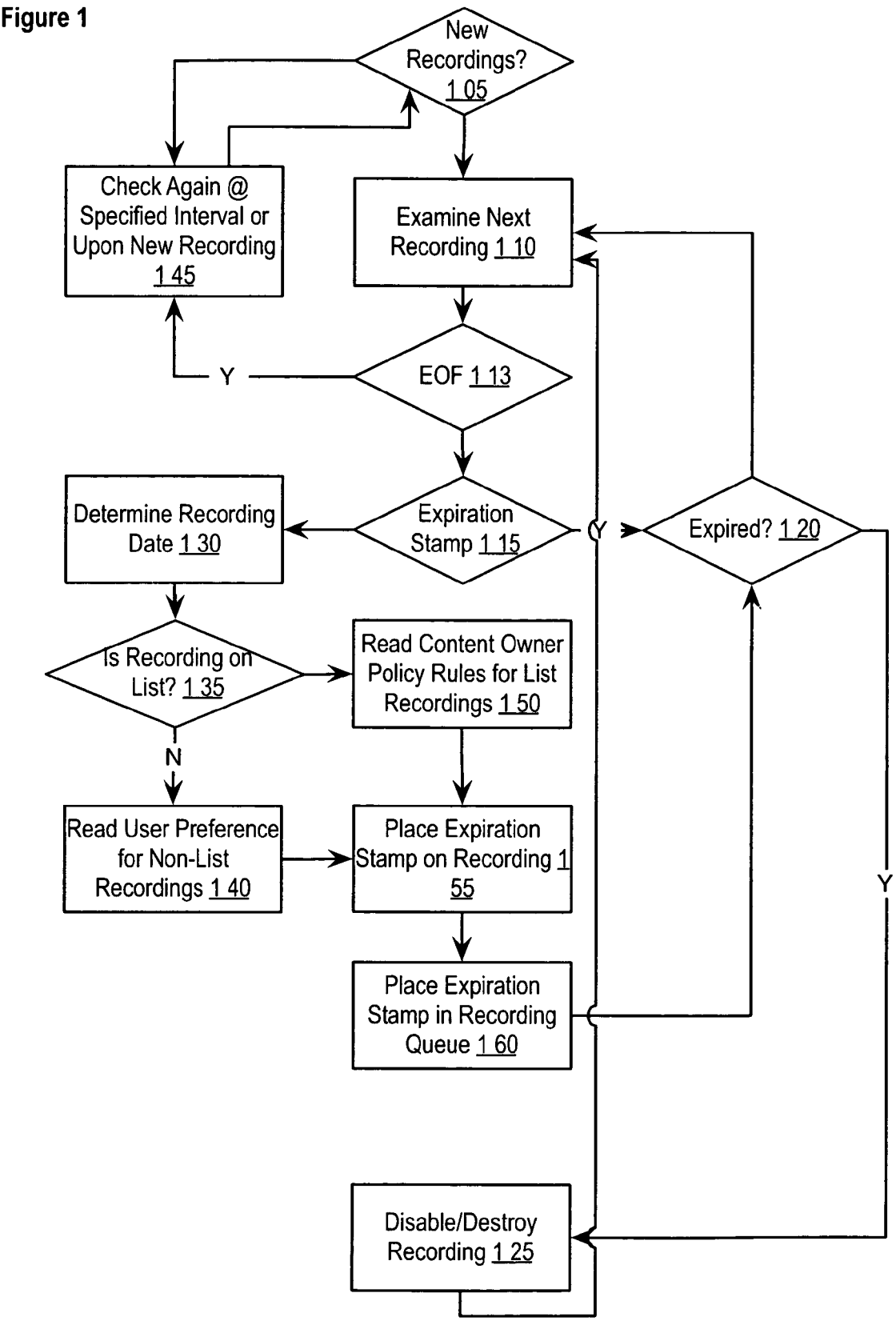
FIG. 1 is of a data-flow diagram illustrating embodiments of the present invention to check recordings for expiration.

FIG. 1 is of a data-flow diagram illustrating embodiments to check recordings for expiration. In one embodiment, the MES determines if new media recordings have come into existence on the system 105. The MES may be integrated into any number of platforms capable of recording media. As a module (which will be described in greater detail throughout the disclosure), the MES may be implemented in memory form for execution on various devices such as computer systems, embedded systems, media devices (e.g., Personal/Digital Video Player/Recorders (PVPs, DVPs, PVRs, DVRs—collectively hereinafter DVR), DVD recorders, MP3 players, portable video players, etc.), and/or the like. In one embodiment, the MES is integrated into a DVR and/or SmartAd Client (SAC). Such a SAC is disclosed in U.S. patent application Ser. No. 10/835,834, titled "Apparatus, Method And System For Intelligent Advertisements." Checking for new recordings 105 may occur at specified intervals. For example, a determination may be initiated through a facility such as a Unix cron job. Also, determination may be initiated 105 each time a new item of media content is recorded. Determination of new media recordings may be identified by examining a file allocation table for additions made to such a registry since the last check. Each time a check is made 105, an entry may be stored in a MES database (e.g., in a views table), static file, registry, and/or the like. If no new recordings are identified since the last check, then the MES will check again upon the fixation of a new recording and/or at a specified interval 145.

If one or more new recordings are found 105, the MES examines the next recording from the collection of newly found recordings 110. If there is no next recording 113, i.e., the collection of new recordings has been exhausted, then an interval check will commence 145. Otherwise 113, the MES determines if the recording include's an expiration stamp 115. The expiration stamp is akin to a freshness date for produce. The expiration stamp may be included with and/or within the recording in numerous formats. In one embodiment, the recording includes metadata tags. For example, MP3 ID tags may be employed to specify an expiration date. In another embodiment, resource file forks may contain expiration metadata. In yet another embodiment, the recording itself may contain the information. For example, a digital watermark may be used to embed the expiration stamp metadata imperceptibly within the recording itself. Other embodiments may include employing a vertical blanking interval and/or closed captioned information associated with a broadcast to contain the expiration stamp. As such, various metadata vessels are contemplated and may hold such expiration stamp information.

If the recording 110 includes an expiration stamp 115, the MES determines if the recording has expired 120. Determination may be achieved by examining the expiration stamp and comparing the date and time stamp within to the current time. Should the current time precede the time frame in the expiration stamp 120, then the MES will examine the next recording if any 110. If the current time has exceeded the time frame in the expiration stamp 120, then the MES will disable or destroy the recording 125. The expirations table and/or media program metadata tables of the MES database may provide rules and/or instructions for how media recordings are to expire. When disabled, a flag is set denoting that the recording may not be played and/or otherwise experienced by the user without further authorization. The flag may be embedded within the recording itself and/or within an associated record in the MES database. Similarly, the MES database may instruct the MES to destroy the media recording. Upon disabling the recording 125, the MES continues examining remaining new recordings 110.

If the recording does not contain an expiration stamp 115, the MES will determine the recording's date of recording. The MES makes this determination by examining the date of recording file creation from the file system. In another embodiment, the MES investigates the date of creation within the metadata associated with the recording. In one embodiment, the MES may consult a digital rights management (DRM) policy, i.e., a content control list or a media recordings list. Such a list and various security layer facilities outlined in U.S. patent application Ser. No. 10/737,870, titled "Apparatus, Method And System To Implement An Integrated Data Security Layer." If the instant recording matches an entry on the media list 135, then the MES obtains associated policy rules, which specify the appropriate expiration time, et al. for the associated recording 150.

In one embodiment of content owner policy rules 150, programs on the list and/or all programs may expire after a pre-determined time interval associated with that class of program. For example, a user's storage device such as a DVR may be instructed by its owner who is not its user (e.g., in the case where it is owned by the cable company), to delete all news programs 24 hours after broadcast, all regular "episodic" shows after one week, and the like. In the case where the DVR is owned by the user, it may still be pre-programmed before or after delivery by, e.g., a program guide service like TiVo to delete classes of programs on a certain schedule as described in the preceding sentence. In this scenario, the metadata associated with the program identifies its class in a recording and metadata table, but that metadata may reach the playback device by a different "logical channel," for example, the class can be stated in a printed or electronic program guide. In one embodiment, where either "per program expiration date/time" or "pre-defined expiration date/time by class" content expiration takes place, the different logical channel by which the expiration date/time reaches the storage/playback device is implemented by closed-caption-like digital data carried within the Vertical Blanking Interval (VBI) of analog TV signals, data sent via "non-viewable" cable TV channels, and/or the like.

If the instant recording does not match an entry on the list 135, then the MES may obtain a user preference to dispose of recordings 140. In one embodiment, if no preference is specified, the oldest recordings are provided with the earliest expiration times. Regardless of where the expiration time originates 140, 150, once an expiration time is obtained, an expiration time is stamped and/or otherwise associated with the recording 155. Once an expiration stamp is associated with the recording 155, an entry for the recording's disposal is placed into a queue to process and dispose of such stale recordings 160. This queue may be checked from time to time and/or on demand 105. If the expiration stamp has exceeded the current time, then it has expired 120. Otherwise 120, the next entry in the recording queue is examined 110.

Vary Expiration

Figure 2:
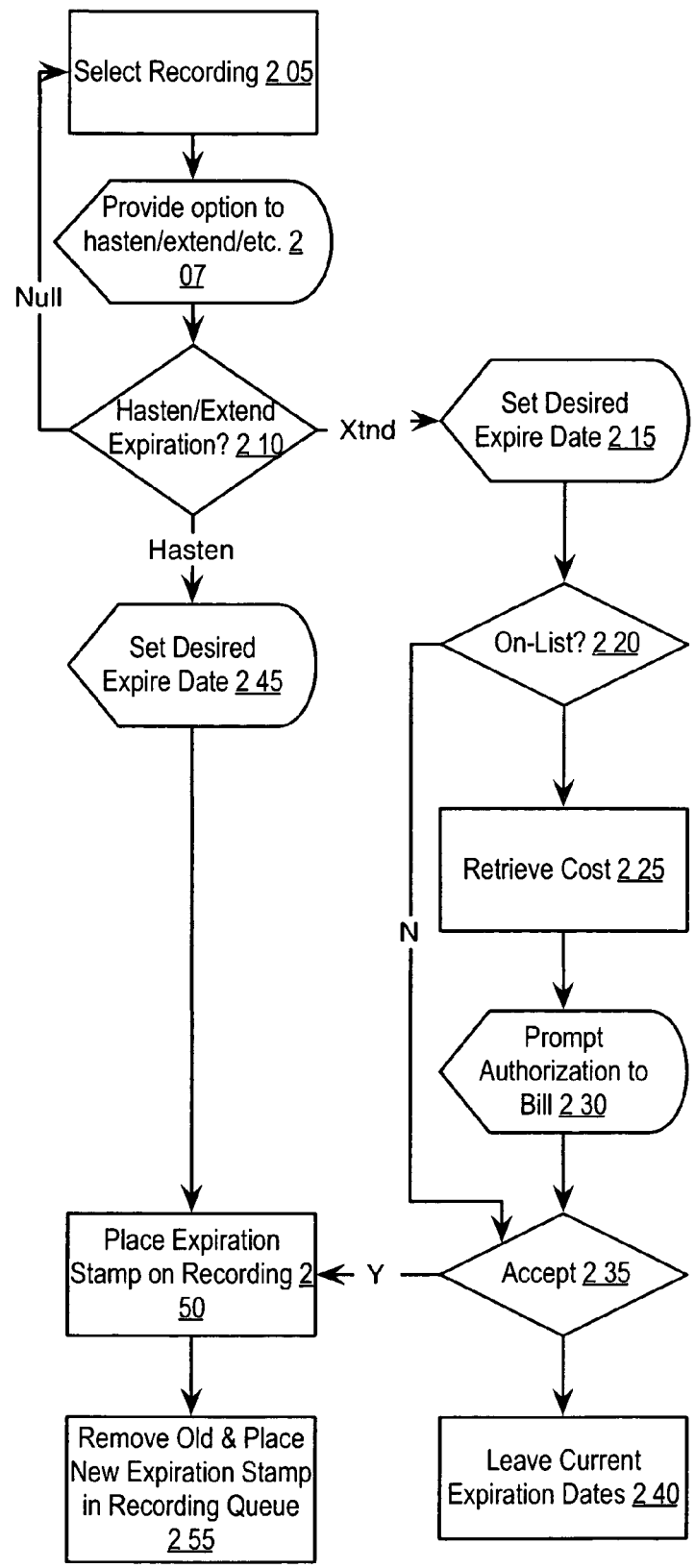
FIG. 2 is of a data-flow diagram illustrating embodiments of the present invention to vary expirations for recordings.

FIG. 2 is of a data-flow diagram illustrating embodiments to vary expirations for recordings. In one embodiment, the MES allows for the selection of a recording. A recording may be selected by a user in the course of experiencing the recording. For example, a user may wish to play a program stored on a DVR. In another context, a user may wish to play a digital audio recording on a portable audio playing device. In yet another context, the user may select attempt to open a file on a computer. Regardless of context, the MES may obtain a selection from within the context in which it exists. For example, on a computer system, an event handler passing the filename as a parameter within the operating system's file manager shell may also pass the filename parameter via an API to the MES, and the MES may pass back instruction to the computer for it to wait for a response before proceeding further.

The MES itself uses, the user's selection of a given recording 205 to determine if the user would like to hasten or extend the recording's expiration date. To do so, the MES may present the user with options to hasten, extend, maintain, and/or other actions that are normally presented to the user in a particular context. In one embodiment, the MES may pass pointers to the context layer to which the MES is integrated. For example, the MES may pass pointers through an API to a file manager shell or media player application to add buttons for hastening, extending, maintaining, and/or the like options 207. Upon a user engaging on such displayed options 207, the MES determines if the user wishes to change expiration settings for the selected recording 210. In one embodiment, the MES receives a call back by way of pointer supplied to the option presentation element 207 to engage the corresponding facility within the MES. If no choice is designated or the user chooses to maintain the current expiration time frame, the MES may allow the user to select another recording 205 or otherwise return control to the context layer.

If the user chose to hasten the expiration 210, the MES may present options to change the desired expiration date. The user may enter expiration dates earlier than a current expiration date up until the current time, i.e., thereby requesting immediate expiration and disposal of the recording 245. Alternatively, if the user chose 207 to extend the expiration date for the selected recording 210, then, similarly, the MES may present options to change the desired expiration date 215. The dates may be well beyond the current expiration date. In one embodiment, the user may chose to make the file never expire.

The MES may then determine if the selected recording is in the media list (as already described in FIG. 1) 220. If the selected recording is not found in the media list 220, then the user may accept or reject their own change of expiration date 235. If the selected recording is matched to an entry on the media list 220, the MES may then obtain costs associated with extending the expiration date 225. The costs may be obtained from an expiration table, policy rules, and/or the like from an MES database and/or the like. Costs may be based on units of time such as a set fee per day. In one embodiment, every extended day specified 215 by the user that extends past the recording's already specified expiration date would incur an additional monetary fee-unit. The user may then be prompted to authorize the costs of extending the viability of the recording 230. The user may then accept or reject the changes and charges 235. If the user supplies a rejection 235, then the recordings current expiration date is not changed 240. If the user accepts 235, a charge is made against the users account if a cost is incurred and the recordings expiration stamp is updated 250 with the newly specified expiration date 215. The MES may then update the expiration queue as already described in FIG. 1. The queue entry associated with the recording is found, removed, and a new entry is scheduled based on the expiration setting 255.

In one embodiment, a server may vary expirations of media remotely on a MES. In such an embodiment, the local MES will affect the media recording at the command of the remote server. For example, the remote server may send a "kill now" instruction to an MES (or to a plurality of MESs). Upon obtaining the "kill now" instruction, the MES will locally disable the media from playing. One way in which the media recording may be disabled is by deleting the recording. In an alternative embodiment, the remote server may change the expiration time by issuing a "set expiration to time" command. In such an embodiment, the MES receives the instruction and changes its local expiration scheduling queue to accelerate or extend the expiration based on the time specified in the "set expiration" command that was received. In one embodiment, such commands are sent on the basis of account information stored in the server's database. The commands may be sent through HTTP(S), SSL and/or other transfer protocol (e.g., through a post command); the commands themselves may be encoded as XML tokens.

Expiration

Figure 3:
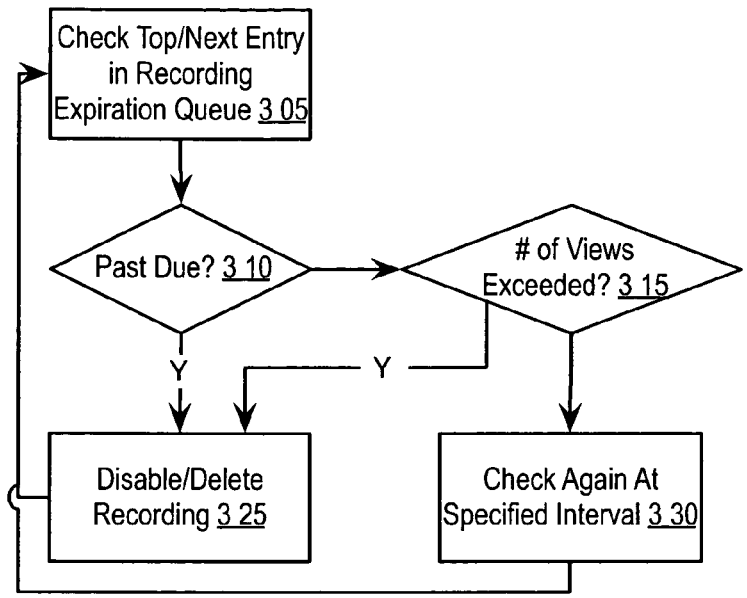
FIG. 3 is of a data-flow diagram illustrating embodiments of the present invention to expire recordings.

FIG. 3 is of a data-flow diagram illustrating embodiments to expire recordings. In one embodiment, the MES checks the next entry in the aforementioned recording expiration queue 305. In one embodiment, the queue is sorted based on expiration date and the first entry has an expiration date closest to the current time as compared to other queue entries. The MES reads the queue entry 305 and determines if it is past due 310. If the queue entry's expiration time exceeds the current time, the expiration of the recording associated with the queue entry is deemed past due 310 and the recording is disabled or deleted 325 as already described in FIG. 1.

If the queue entry's expiration time does not exceed the current time, the expiration associated with the queue entry is not past due 310 and the MES may determine if the number of recording views has been exceeded 315. In one embodiment, every time a user plays and/or otherwise experiences the recording, the MES maintains a view counter in its database. The MES may limit the number of times a user is able to view the recording as specified in policy rules as already described in FIGS. 1 and 2. The user may obtain rights for additional views similarly to the way in which the user would extend the recording's expiration date 225. If the number of views has been exceeded 315, the MES may disable the recording as has already been mentioned 325. If the recording is not past due 310 and the number of available views has not been exceeded by the user 315, then the MES may check the expiration queue later at a specified interval and/or on demand 330. Checking the queue for expirations at specified intervals may occur through cron job requests.

In one embodiment, a storage/playback device may be pre-programmed with certain limits (either at purchase or during subsequent updates) that specify the maximum usage time limits, and/or views for individual programs or classes of programs. In such cases, upon requesting an extension of usage time and/or additional views, the user may be informed using the GUI that his requested extension cannot be approved, obviating the generation of a message requesting the same back to the service provider. For example, the metadata associated with a program may specify both a nominal expiration date/time (in absence of attempts at extension by the user) as well as a maximum-permitted extension time (or latest possible expiration date/time, as convenient in the detailed implementation of a given system). Similarly, a maximum number of views limit may be set. The limits may be provided in the expiration table in the MES database. In cases where the users request for extension cannot be fully-honored, the user may be presented with the option to extend the expiration date/time to the pre-defined limit, upon payment of the appropriate fee.

It should be noted that broadcast programming stored on the DVR may be obtained through various conduits. For example, the broadcasts may be received through traditional RF television broadcasts, as well as through cable television, satellite, TCP/IP and/or the like feeds.

Advertisement Expiration

Figure 4A:
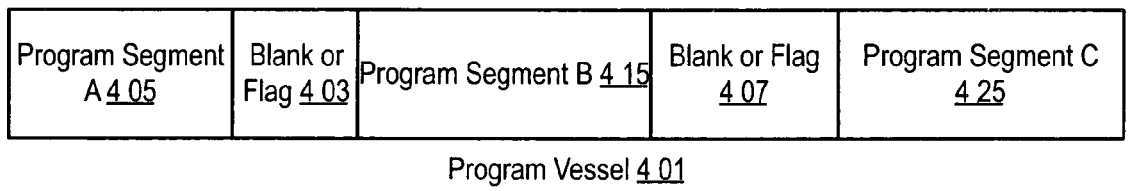
FIGS. 4A-C depict block diagram embodiments of advertising segments within a program vessel.
Figure 4B:
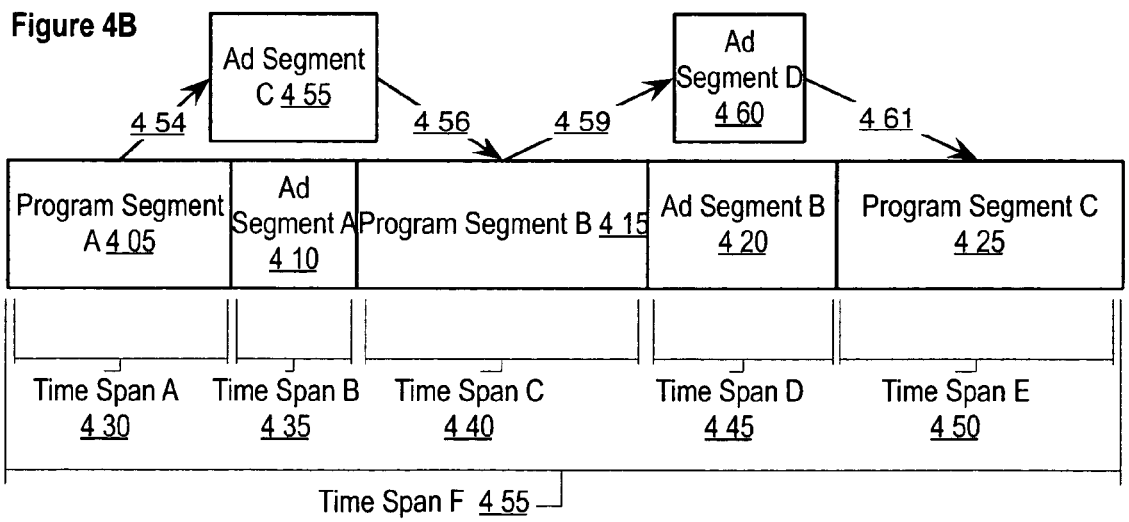
Figure 4C:
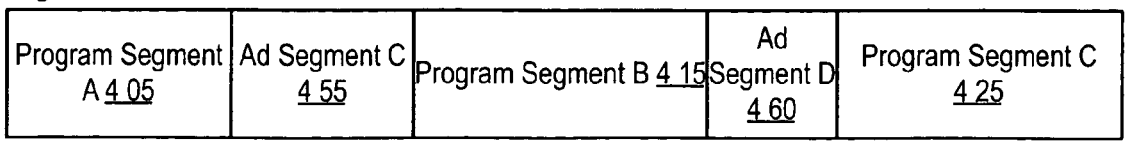

FIGS. 4A-C are of a block diagram illustrating embodiments of advertising segments within a program vessel. In one embodiment, ads within a program may expire and be replaced while leaving the programming vessel unaffected. The vessel spans the entirety of time including the program segments and the advertising segments. In such a situation, the advertisements themselves are considered to be the media that is to expire, and the surrounding program is merely a vessel that is to remain unaffected. This allows for the refreshing of stale ads, and/or ads whose impression counts have been exceeded. In such a case, those stale ads will be removed and replaced with new ads.

FIG. 4A illustrates that the program vessel 401 generally contains program segments A 405, B 415, C 425, which in turn are separated. In one embodiment, the program segments in the vessel are separated by blank spacers 407. In another embodiment, the program segments are separated by next-segment-flags (flags) 407 indicating a separating segment. In one embodiment, the flags are data structures that point to the next segment to play. That next segment may be another program segment, another ad segment, interactive payment prompts and/or the like. In another embodiment, the data structures may simply indicate the type of segment to be used, and the MES intercepts the request for a "next segment" and provides a segment through a scheduler or just-in-time. In another embodiment, the MES may employ a Smart Ads Client to provide its interspersed ads when encountering the flags.

FIG. 4B illustrates another embodiment where advertising segments A 410 and B 420 are interspersed throughout a program vessel (e.g., broadcast programming stored on a DVR). For example, a DVR may record a program along with commercial advertisements. Each of program segments A, B and C occupy time spans A 405, C 415 and E 425, respectively, within the program vessel. Interspersed between the program segments, ad segments A 410 and B 420 may span times B 440 and D 445, respectively, within the program vessel. As such, the program vessel itself spans the entirety of time occupied by the program and ad segments, i.e., time span F 455.

In either case, ad segments A and B, upon expiration, may be replaced with ad segments C and D. In such a scenario, the MES may physically destroy ad segments A and B and copy in ad segments C and D as replacements; thereby reconstructing the file into a new vessel containing program segments A, B and C and ad segments C and D as shown in FIG. 4C. Further in FIG. 4B, the replacement ad segments do not have to occupy the same time spans as did former ad segments A and B. The program vessel may be broken up and rewritten with the new segments in place. In an alternative embodiment, flags within the program vessel are use to redirect display flow around embedded ad segments A 454, 456 and B 459, 461 to replacement ad segments C and D. In such an embodiment, as a device (e.g., DVR) plays the entirety of the program vessel and encounters an advertising flag, it will play ad segments C and D instead of ad segments A and B, respectively; the device may do this without ever altering the program vessel itself. In this way, the original ad segments A and B will remain intact within the program vessel, and the device will simply read in ad segments C and D from its storage space. After reaching the end of the replacement ad segments C 456 and D 461, the device may then continue to show program segments B and C, respectively. Thus, the system provides the replacement of ads without modifying the program vessel itself. It should also be noted, that such an embodiment has the advantage of allowing ad segments to be of differing time spans from originally embedded ad segments without have to re-write the entire program vessel.

Media Expiration System Controller

Figure 5:
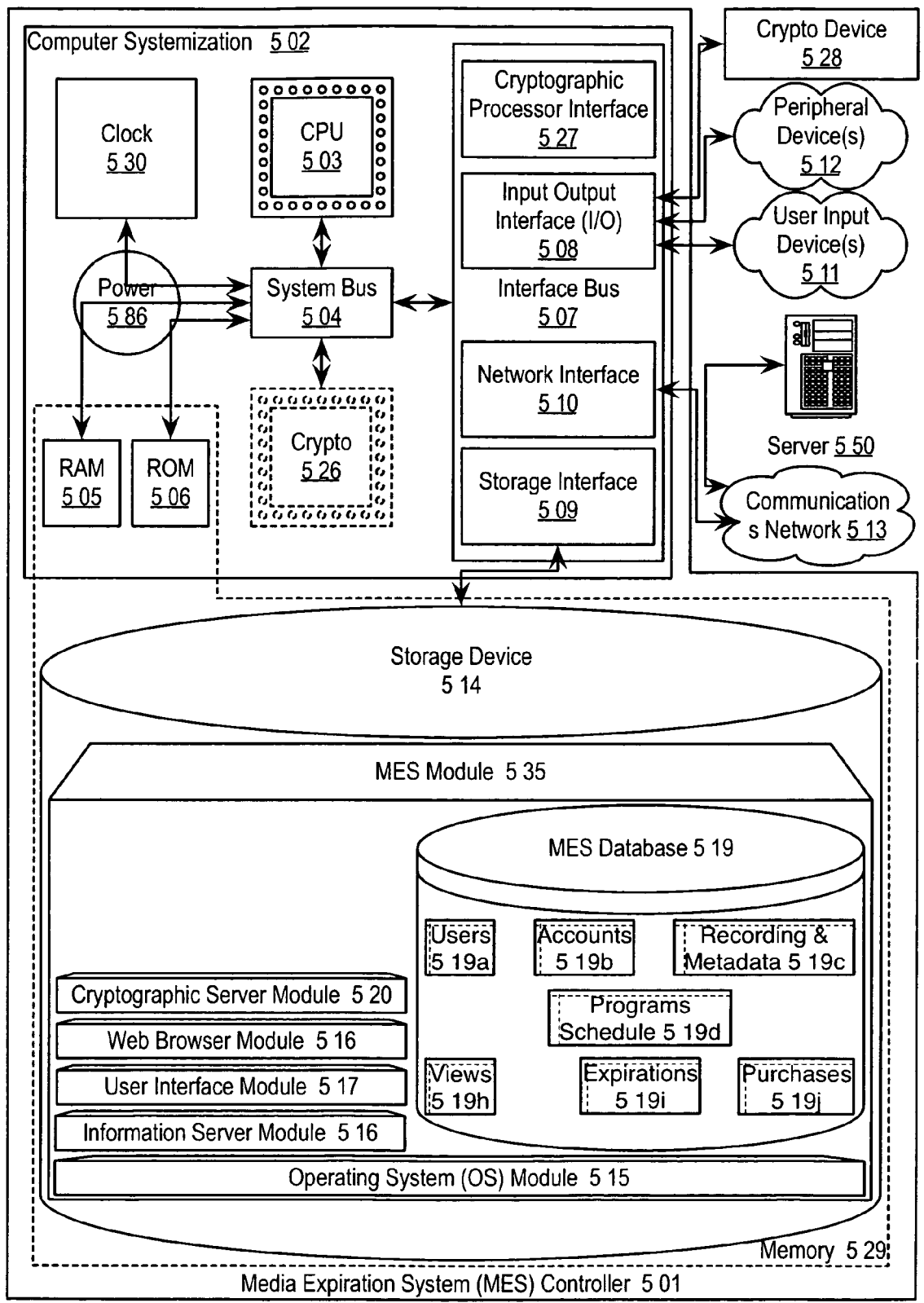
FIG. 5 is of a block diagram illustrating embodiments of the present invention of a Media Expiration System controller.

FIG. 5 is of a block diagram illustrating embodiments of a Media Expiration System (MES) controller 501. In this embodiment, the MES controller 501 may serve to process, store, search, serve, identify, instruct, generate, match, and/or update recordings, expirations, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the MES controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A MES controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, are all interconnected and/or communicating through a system bus 504. Optionally, the computer systemization may be connected to an internal power source 586. Optionally, a cryptographic processor 526 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the MES controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the MES thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a/b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the MES controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the MES controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that a MES controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 529 may contain a collection of program and/or database modules and/or data such as, but not limited to: operating system module(s) 515 (operating system); information server module(s) 516 (information server); user interface module(s) 517 (user interface); Web browser module(s) 518 (Web browser); database(s) 519; cryptographic server module(s) 520 (cryptographic server); MES module(s) 535; and/or the like (i.e., collectively a module collection). These modules may be stored and accessed from the storage devices and/or from storage devices accessible through an interface bus. Although non-conventional software modules such as those in the module collection, typically, are stored in a local storage device 514, they may also be loaded and/or stored in memory such as: peripheral devices, RAM, remote storage facilities through a communications network, ROM, various forms of memory, and/or the like.

Operating System

The operating system module 515 is executable program code facilitating the operation of a MES controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the MES controller to communicate with other entities through a communications network 513. Various communication protocols may be used by the MES controller as a subcarrier transport mechanism for interaction, such as, but not limited to: multicast, TCP/IP, UDP, unicast, and/or the like.

Information Server

An information server module 516 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a MES controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the MES database 519, operating systems, other program modules, user interfaces, Web browsers, and/or the like.

Access to the MES database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MES. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MES as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 517 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 518 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from MES enabled nodes. The combined application may be nugatory on systems employing standard Web browsers.

Cryptographic Server

A cryptographic server module 520 is stored program code that is executed by the CPU 503, cryptographic processor 526, cryptographic processor interface 527, cryptographic processor device 528, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management, and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MES may encrypt all incoming and/or outgoing communications and may serve as node within a virtual private network (VPN) with a wider communications network. The cryptographic module facilitates the process of "security authorization" whereby, access to a resource is inhibited by a security protocol wherein the cryptographic module effects authorized access to the secured resource. In addition, the cryptographic module may provide unique identifiers of content, e.g., employing and MD5 hash to obtain a unique signature for an digital audio file. A cryptographic module may communicate to and/or with other modules in a module collection, including itself, and/or facilities of the like. The cryptographic module supports encryption schemes allowing for the secure transmission of information across a communications network to enable a MES module to engage in secure transactions if so desired. The cryptographic module facilitates the secure accessing of resources on MES and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

MES Database

A MES database module 519 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MES database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of Object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the MES database is implemented as a data-structure, the use of the MES database 519 may be integrated into another module such as the MES module 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database module 519 includes several tables 519*a-d*, h-j. A users table 519*a* includes fields such as, but not limited to: an user name, address, user_id, credit card information, and/or the like. The user table may support and/or track multiple users on a MES. An accounts table 519*b* includes fields such as, but not limited to: account_id, admin_user_id (a user given administrative status to control the account), account_level, and/or the like. A recording_metadata table 519*c* includes fields such as, but not limited to: recording_title, recording_description, recording_id, closed_captioned_text, recording_data, recording_schedule_id, and/or the like. A recording_schedule table 519*d* includes fields such as, but not limited to: recording_id, air time, duration, and/or the like. A views table 519*h* includes fields such as, but not limited to: view_id, recording_id, view_counter, user_id, view_start, view_duration, and/or the like. An expirations table 519*i* includes fields such as, but not limited to: expirations_id, recording_id, view_id, impression_opportunity_count, expiration_date, expiration_condition (e.g., a conditional to set expirations), and/or the like. A purchases table 519*j* includes fields such as, but not limited to: recording_id, view_id, expirations_id, account_id, users_id, debit_value, and/or the like.

In one embodiment, the MES database may interact with other database systems. For example, employing a distributed database system, queries and data access by MES modules may treat the combination of the MES database, an integrated data security layer database as a single database entity.

In one embodiment, user programs may contain various user interface primitives, which may serve to update the MES. Also, various accounts may require custom database tables depending upon the environments and the types of clients a MES may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 519a j. The MES may be configured to keep track of various settings, inputs, and parameters via database controllers.

A MES database may communicate to and/or with other modules in a module collection, including itself, and/or facilities of the like. Most frequently, the MES database communicates with a MES module, other program modules, and/or the like. The database may contain, retain, and provide information regarding other nodes and data.

MES

A MES module 535 is stored program code that is executed by the CPU. The MES affects accessing, obtaining and the provision of information, services, transactions, and/or the like across various communications networks.

The MES enables media owners to disable recordings of their program content after it has been recorded by a consumer. The MES may work in concert with a SmartAd Client and/or an Integrated Data Security Layer thereby providing greater control over media content. The MES tracks viewing habits, enables the purchasing of extended views of programs, removes expired media programming content, and more. The MES coordinates with the MES database to identify interassociated items relating to programs, ads, and/or any related transactions and acts upon any provided information.

A MES module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the MES server employs a cryptographic server to encrypt and decrypt communications. A MES module may communicate to and/or with other modules in a module collection, including itself, and/or facilities of the like. Most frequently, the MES module communicates with a MES database, operating systems, other program modules, and/or the like. The MES may contain, communicate, generate, obtain, and/or provide program module, system, user, and/or data communications, requests, and/or responses.

Distributed MES

The structure and/or operation of any of the MES node controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the MES controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable, to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-enabled method to terminate a broadcasted advertising content recorded by a recording device of a user, comprising:
   identifying the recorded advertising content on the recording device of the user;
   determining whether the recorded advertising content includes an indicia that defines a termination time of the recorded advertising content;
   assigning a termination time for the recorded advertising content, if it is determined in the determining step that no termination time exists for the recorded advertising content;
   attaching said termination time to said recorded advertising content; and
   playing the recorded advertising content only if a current time has not reached the termination time defined by the indicia.

2. The method of claim 1 wherein the time of termination is extendable upon payment of extension fees.

3. The method of claim 1, wherein content owner policy rules are embedded within the recorded advertising content.

4. The method according to claim 3, wherein the content owner policy rules limit the number of impressions that are experienced by the user.

5. The method according to claim 4, wherein the playing step plays the recorded advertising content only if the number of impressions that are experienced by the user has exceeded the limitation defined by the content owner policy rules.

6. The method of claim 1, wherein content owner policy rules are received from a local database.

7. The method of claim 1, wherein content owner policy rules are received from a remote server.

8. The method of claim 1, wherein the termination time is established on the basis of user preferences.

9. The method of claim 1, wherein the termination time is established on the basis of content owner policy rules, if the recorded advertising content is owned by a content owner.

10. The method of claim 1, wherein content owner policy rules establish the termination time.

11. The method according to claim 1, further comprising scheduling the recorded advertising content for termination after the termination time.

12. A processor enabled method to terminate a broadcasted program recorded by a recording device of a user, comprising:
   identifying the recorded program on the recording device of the user;
   determining whether the recorded program includes an indicia that defines a termination time of the recorded program;
   establishing a termination time for the recorded program, if it is determined in the determining step that no termination time exists for the recorded program; and
   playing the recorded program, only if a current time has not reached the termination time defined by the indicia.

13. The method of claim 11, further, comprising:
   establishing a termination time for the recorded program, if no termination time exists for the recorded program wherein content owner policy rules are embedded with the recorded program.

14. The method of claim 13, further, comprising:
   terminating the recorded program, if a number of impressions that are experienced by a user has been exceeded wherein the content owner policy rules limit the number of impressions that are experienced by the user.

15. The method of claim 14, wherein the playing step plays the recorded program only if a number of impressions that are experienced by the user has not been exceeded a limitation defined by the content owner policy rules.

16. The method of claim 15, wherein the number of impressions are extended upon payment of extension fees.

17. The method of claim 12, wherein the termination time is obtained from a tag within the recorded program.

18. The method of claim 12, wherein the termination time may be obtained from associated metadata.

19. The method of claim 12, wherein the termination time is established by the user.

20. The method of claim 12, wherein the termination time may be extended upon payment of extension fees.

21. The method of claim 12, further comprising determining whether the recorded program is owned by a content owner.

22. The method of claim 12, wherein the playing includes disabling the recorded program from further access by users.

23. The method of claim 12, wherein the playing includes destruction of the recorded program so the recorded program is inaccessible by users.

24. The method of claim 12, further comprising authorizing access to the recorded program, if the current time has not reached the termination time defined by the indicia.

25. The method of claim 12, further comprising authorizing access to the recorded program, if a number of impressions that are experienced by the user has not been exceeded a predetermined value.

26. The method of claim 12, wherein the playing step of the recorded program occurs on a digital video recorder of the user.

27. The method according to claim 12, further comprising scheduling the recorded program for termination after the termination time.

28. The method of claim 12, wherein the termination time is established by content owner policy rules.

* * * * *